US008081181B2

(12) United States Patent
Peeper

(10) Patent No.: US 8,081,181 B2
(45) Date of Patent: Dec. 20, 2011

(54) PREFIX SUM PASS TO LINEARIZE A-BUFFER STORAGE

(75) Inventor: Craig Peeper, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 967 days.

(21) Appl. No.: 11/766,091

(22) Filed: Jun. 20, 2007

(65) Prior Publication Data
US 2008/0316214 A1 Dec. 25, 2008

(51) Int. Cl.
*G06T 15/40* (2006.01)
(52) U.S. Cl. ........ 345/421; 345/501; 345/530; 345/543; 345/581; 712/30; 707/752; 707/753
(58) Field of Classification Search .................. 345/543, 345/473; 718/101
See application file for complete search history.

(56) References Cited

U.S. PATENT DOCUMENTS

| 5,471,567 | A | 11/1995 | Soderberg et al. |
| 5,799,300 | A * | 8/1998 | Agrawal et al. ........................ 1/1 |
| 5,872,902 | A | 2/1999 | Kuchkuda et al. |
| 6,185,438 | B1 | 2/2001 | Fox |
| 6,515,661 | B1 | 2/2003 | Dawson |
| 6,567,099 | B1 | 5/2003 | Dawson |
| 6,577,307 | B1 | 6/2003 | Hsiao et al. |
| 6,661,424 | B1 | 12/2003 | Alcorn et al. |
| 6,690,384 | B2 | 2/2004 | Chiu et al. |
| 6,750,869 | B1 | 6/2004 | Dawson |
| 6,999,100 | B1 | 2/2006 | Leather et al. |
| 7,034,846 | B2 | 4/2006 | Dawson |
| 7,725,518 | B1 * | 5/2010 | Le Grand ...................... 708/490 |
| 2004/0080512 | A1 * | 4/2004 | McCormack et al. ........ 345/543 |
| 2005/0068326 | A1 | 3/2005 | Nakahashi et al. |
| 2005/0162441 | A1 | 7/2005 | Dawson |
| 2007/0120858 | A1 * | 5/2007 | Meinds ......................... 345/473 |
| 2007/0130140 | A1 * | 6/2007 | Cytron et al. ..................... 707/6 |
| 2009/0125907 | A1 * | 5/2009 | Wen et al. ..................... 718/101 |

OTHER PUBLICATIONS

Belloch, Guy E., "Prefix Sums and Their Applications", Carnegie Mellon University, 1990.*
Harris, Mark, "Parallel Prefix Sum (Scan) with CUDA", Apr. 2007.*
Winner, et al., "Hardware anti-aliasing", retrieved at <<http://www.computerweekly.com/Articles/1999/08/19/178923/Hardware+anti-aliasing . . . .htm>>, Aug. 19, 1999, Stephanie Winner, Mike Kelley, Brent Pease, Bill Rivard, and Alex Yen, Apple Computer, 3Dfx, SGI, 1998, pp. 1-4.
Winner, et al., "Hardware Accelerated Rendering of Antialiasing Using a Modified A-buffer Algorithm", ACM, 1997, pp. 10.
Haeberli, et al., "The Accumulation Buffer: Hardware Support for High-Quality Rendering", Silicon Graphics Computer Systems, vol. 24, No. 4, Aug. 6-10, ACM, 1990, pp. 309-318.

(Continued)

*Primary Examiner* — Xiao M. Wu
*Assistant Examiner* — Phi Hoang

(57) ABSTRACT

The architecture implements A-buffer in hardware by extending hardware to efficiently store a variable amount of data for each pixel. In operation, a prepass is performed to generate the counts of the fragments per pixel in a count buffer, followed by a prefix sum pass on the generated count buffer to calculate locations in a fragment buffer in which to store all the fragments linearly. An index is generated for a given pixel in the prefix sum pass and stored in a location buffer. Access to the pixel fragments is then accomplished using the index. Linear storage of the data allows for a fast rendering pass that stores all the fragments to a memory buffer without needing to look at the contents of the fragments. This is then followed by a resolve pass on the fragment buffer to generate the final image.

20 Claims, 9 Drawing Sheets

OTHER PUBLICATIONS

Jouppi, et al., "Z3: An Economical Hardware Technique for High-Quality Antialiasing and Transparency", ACM, 1999, pp. 10.

Carpenter, The A-buffer, an Antialiased Hidden Surface Method, Computer Graphics, vol. 18, No. 3, Jul. 1984.

* cited by examiner

PREFIX SUM PASS TO LINEARIZE A-BUFFER STORAGE

BACKGROUND

The rapid advances in hardware and software technologies facilitate not only improved business capabilities but also user entertainment. In the area of video or graphics subsystems, the interplay between software advances and hardware advances is driving graphics rendering to new levels. One particular driver in this area is computer games where users are demanding more realistic rendering. This is demonstrated by the fact that online and offline computer games account for a growing multi-billion dollar a year business. In either case, vendors continue to seek ways in which to provide faster and more realistic graphics.

One problem associated with the drawing of a realistic scene is transparent objects. In the natural world there are very few things that truly are transparent. However, in the virtual world degrees of transparency must be addressed to provide the desired effect. The problem of rendering transparent objects is related to the order of the contributions provided by each transparent surface. The contributions of surfaces must be sorted based on the distance to the viewer in order to get correct output. To further complicate the problem, this ordering must be maintained at the smallest granularity at which the image is resolved (e.g., at the pixel level with no anti-aliasing or at the sample level with anti-aliasing). It is possible to sort at the primitive level if no primitive intersections are allowed, but that is a difficult restriction to maintain.

The transparency solution can be considered in the critical path for performance of any rendering application. Good performance is critical for any solution. In addition, the performance needs to be good at both the current content and for new higher visual depth scenes. Memory bandwidth and memory consumption are primary factors in determining the final performance of a solution.

A number of conventional methods exist for providing order independent transparency and anti-aliasing processing via an A-buffer approach. However, for hardware solutions, most either used fixed storage per pixel or a linked-list approach. Fixed storage uses an inordinate amount of memory, and much of that memory goes unused. Additionally, a linked-list or related approach is slow due to the amount of memory touched for each access.

Thus, an arbitrarily sized output is a problem for transparency solutions that store all visible fragments. If failure cases can happen on low end parts or intermittently on mid/high end parts, a large support cost is incurred by the developers. Generally, mechanisms should be available that provide easily definable solutions for efficiently rending graphics.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture implements A-buffer (or alpha) in hardware by extending hardware to efficiently store a variable amount of data for each pixel. This is accomplished without linked lists and without a fixed storage for each pixel.

In operation, a prepass is performed to generate the counts of the fragments per pixel in a count buffer, followed by a prefix sum pass on the generated count buffer to calculate locations in a fragment buffer in which to store all the fragments linearly. An index is generated for a given pixel in the prefix sum pass. Access to the pixel fragments is then accomplished using the index. Linear storage of the data (e.g., bins of fragments) allows for a fast rendering pass that stores all the fragments to a memory buffer without needing to look at the contents of the fragments. This is then followed by a resolve pass on the fragment buffer to generate the final image.

A more generalized process begins by rendering the entire scene to count the number of fragments per pixel in the count. The prefix sum pass is processed on the count buffer to generate a location buffer. Each pixel represents an index that "points" to a memory (e.g., fragment buffer) for storing the fragments. The scene is then rendered again. For each fragment generated during the rendering, the next location for a fragment for the current pixel is obtained from the location buffer. The process then increments a value in the location buffer for the current pixel to advance to the next location. The associated fragment information is then written out to the given location in the fragment buffer.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
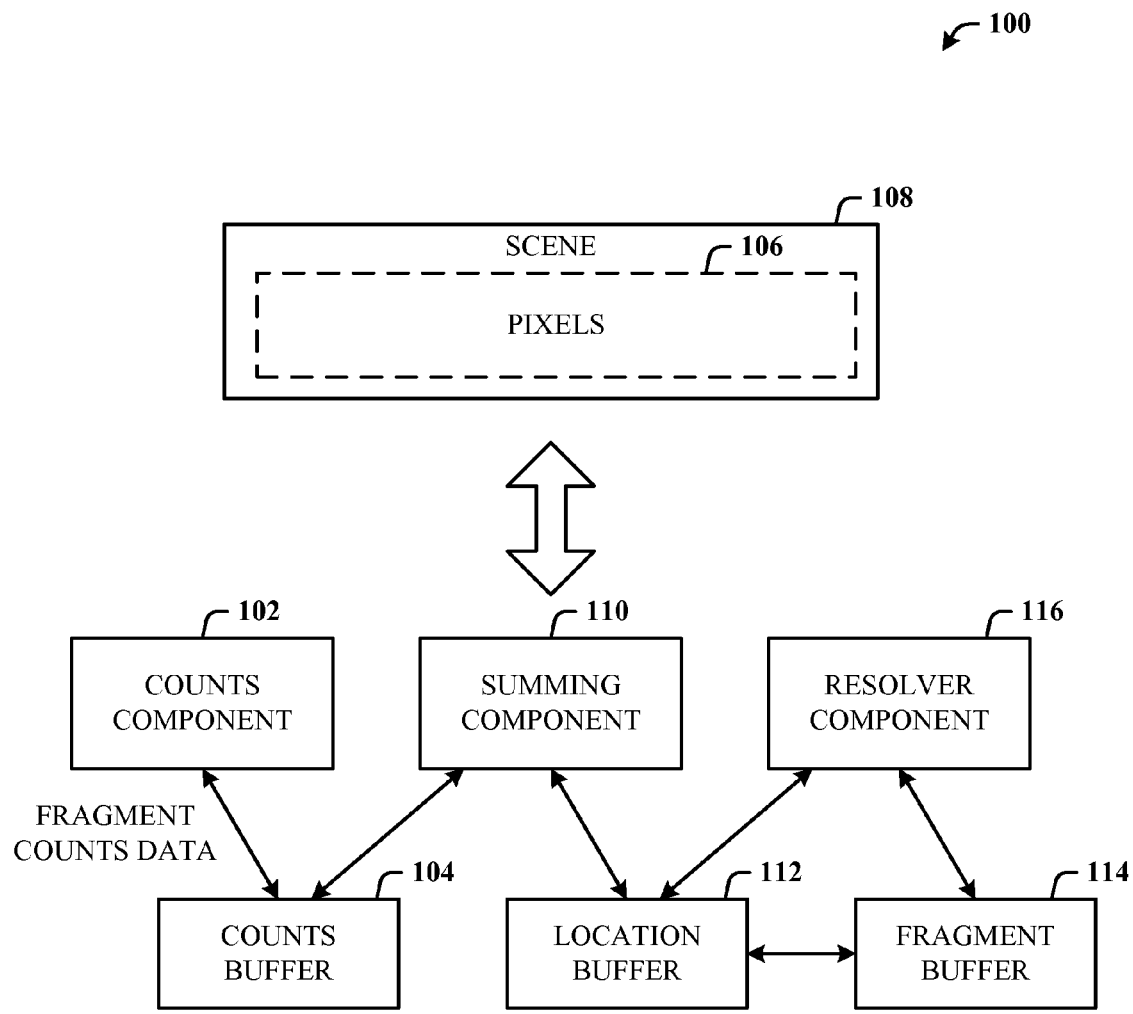
FIG. 1 illustrates a rendering system for providing linearized A-buffer storage.

An A-buffer, at a conceptual level, can be defined as a buffer that contains a list of contributions per pixel/sample that are resolved after all contributions have been added.

The disclosed architecture facilitates linearized A-buffer storage based on utilization of a count pass and prefix sum pass to roughly sort the fragments. The order of the "sort" is based on the size of the render target, and not the number of fragments. Thus, the algorithm scales well and runs in a linear time based on the number of fragments each frame.

A goal of all the passes is to generate and resolve a fragment buffer while "touching" memory as few times as possible. Moreover, minimizing the sort overhead and the fragment generation pass overhead provides for more efficient graphics processing.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

The following terminology will be employed to describe aspects of the novel architecture.

Visible depth complexity (VDC) is the number of fragments that visibly affect a pixel.

Max-VDC is over the entire render target.

Avg-VDC is the average number of fragments that visibly affect a pixel over the entire render target. Avg-VDC*NumberOfPixels is the smallest number of fragments to store and still get the correct result.

Fragment is a tuple of a triangle clipped against a pixel, the tuple including depth, color and coverage information.

Sample is a sub-pixel location at which to evaluate anti-aliasing.

Pass is a walk of the scenegraph to render the scene or generate other data (e.g., a Z-prepass).

Phase is an operation on data from a previous pass/phase that generates an output (e.g., resolves on a MSAA (multi-sampling anti-aliasing) render target).

Following is a description of some constraints that are related to the problem to be solved.

Highly variable visible depth complexity. The scenes that require OIT (order independent transparency) have a very high variance in the depth complexity even for nearby pixels. In a test scene with a complex tree/grass/island, there can be pixels with a VDC of 50 next to pixels with a VDC of 1. The Avg-VDC for the test scene was 1, which is reasonable to consider storing the entire scene, but the transparency solution needs to handle this variance well.

Excessive or even multiple passes on the scene are not desirable. This works against minimizing CPU (central processing unit) overhead caused by the scene traversal. This overhead is a large bottleneck faced by games today and does not need to be enlarged.

Execution independence between the graphic processing unit (GPU) and the CPU should be maintained. As long as sufficient work is done by the GPU, the work on the GPU can be completely overlapping with the CPU.

Allow for improved anti-aliasing. In order to get the desired image quality, there needs to exist very high quality anti-aliasing.

Performance. Consider that a transparency solution is in the critical path for performance of any rendering application.

Fallback situation handling. Arbitrary sized output is a problem for transparency solutions that store all visible fragments. A transparency solution needs to have a failure situation that is easy to design content to avoid.

Referring initially to the drawings, FIG. 1 illustrates a rendering system 100 for providing linearized A-buffer storage. The system 100 includes a counts component 102 for computing and storing fragment count data in a counts buffer 104. The count data is for pixel fragments of each of a plurality of pixels 106 of a scene 108. A summing component 110 of the system 100 is provided for computing prefix sums on the count data to define location information (e.g., an index) in a location buffer 112, which location information defines locations in a fragment buffer 114 in which to store the fragments (e.g., bins of fragments).

A prepass process is performed to generate the counts of the fragments per pixel, followed by the prefix sum pass on the generated counts buffer 104 to calculate locations in the location buffer 112 to store all the fragments linearly, that is, all the fragments for pixel 0, followed by all fragments for pixel 1, and so on. Access to a given pixel's fragments is provided by an index generated for a given pixel in the prefix sum pass, which indexes are stored in the locations buffer 112. Linear storage of the data allows for a fast rendering pass that stores all the fragment indexes in the location buffer 112 of memory without looking at the contents of the fragments.

This is then followed by a resolve pass executed by a resolver component 116 on the location buffer 112 to generate the final scene. The resolver component 116 generates the final scene based on the location indexes in the location buffer 112. The resolver component 116 also reads an offset to a next storage location in the fragment buffer 114 based on the index information stored in the location buffer 112 for a current pixel. Fragments of a pixel are resolved by the resolver component 116 by sorting the pixel fragments according to a depth order. Blending is then performed by the resolver component 116 according to the depth order.

In other words, the architecture includes a method of using a count pass followed by a prefix sum pass to roughly sort the fragments. The order of the "sort" can be based on the size of the render target, but not necessarily the number of fragments. Thus, the architecture scales well and runs in linear time based on the number of fragments for each frame. The goal of all the passes is to generate and resolve the counts buffer 104 while minimizing memory access, as well as the sort overhead and the fragment generation.

Figure 2:
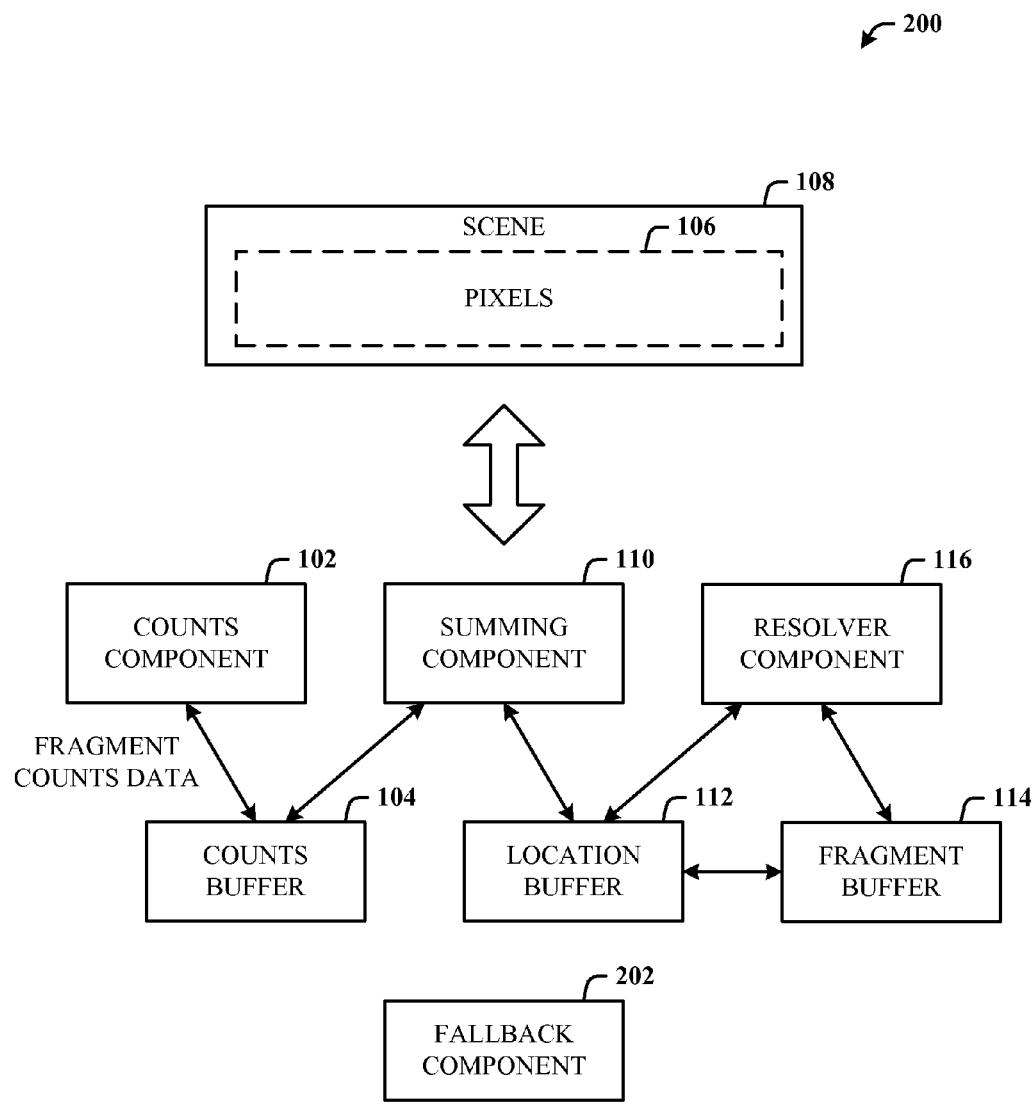
FIG. 2 illustrates an alternative system that employs a fallback component for addressing memory space issues.

FIG. 2 illustrates an alternative system 200 that employs a fallback component 202 for addressing memory space issues. A number of fallback options exist when all fragments of a scene cannot be stored in the fragment buffer 114. The application can render black, re-render the scene at a lower resolution, drop layers from pixels in the fragment buffer 114, and/or generate a lower resolution fragment buffer from the high resolution prefix sum data. This is described in greater detail hereinbelow.

Figure 3:
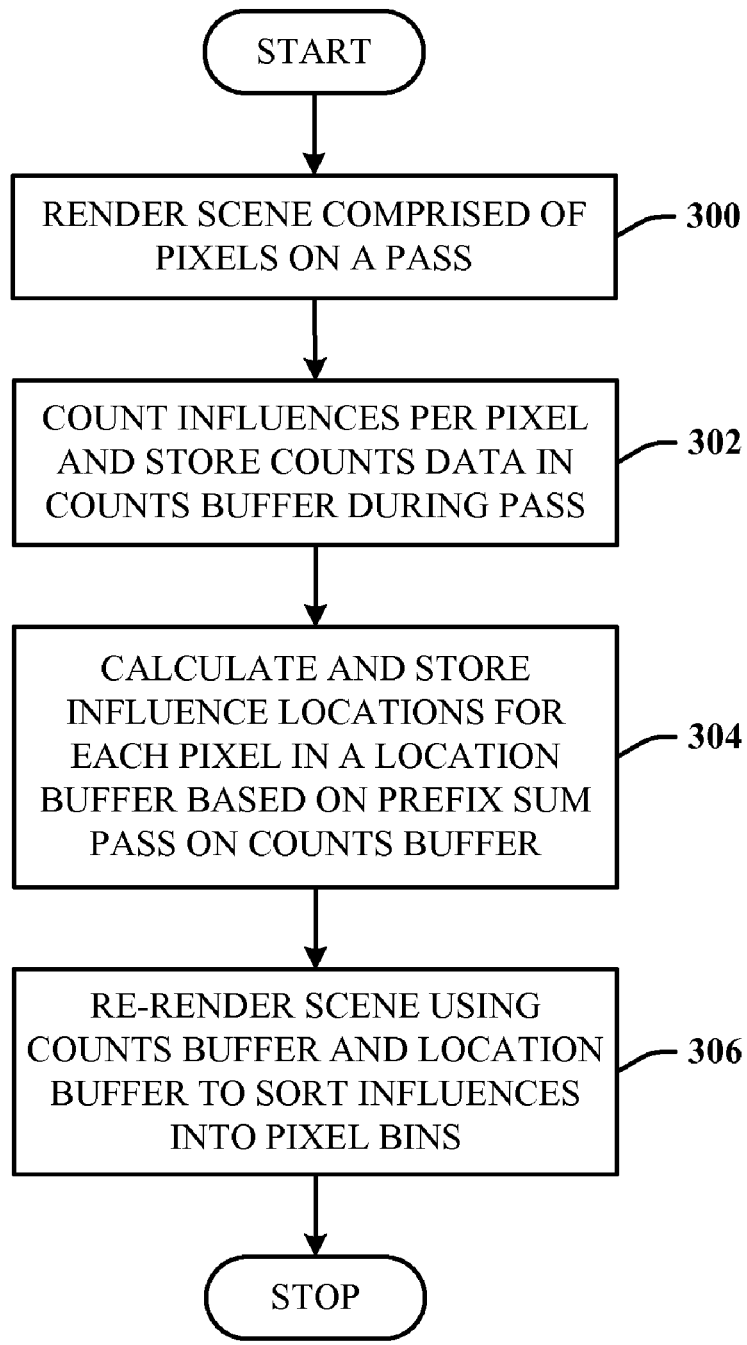
FIG. 3 illustrates a method of processing a scene.

FIG. 3 illustrates a method of processing a scene. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 300, a scene comprised of pixels is rendered on a pass. At 302, the influences per pixel are counted and the counts data is stored in a counts buffer. At 304, influence locations (e.g., indexes) are calculated and stored for each pixel in a location buffer based on a prefix sum pass on the counts buffer. At 306, the scene is re-rendered using the counts buffer and the location buffer to sort the influences into pixel bins.

Figure 4:
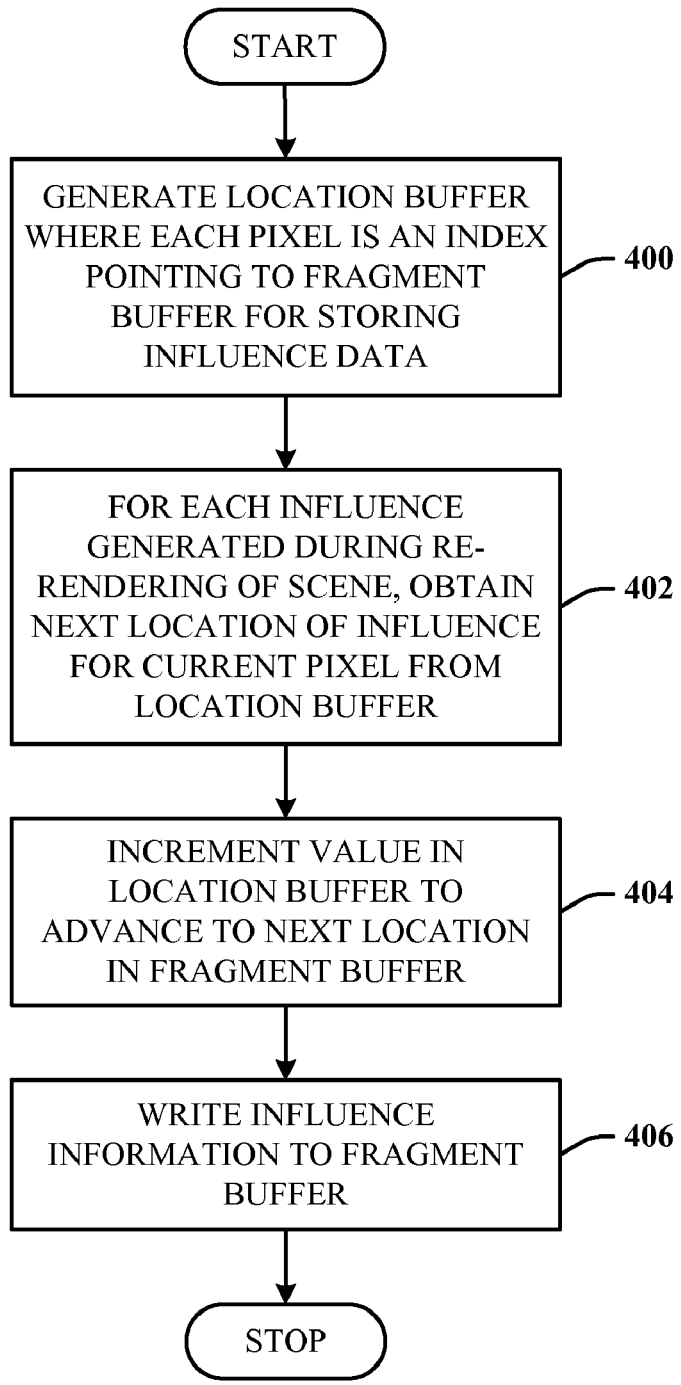
FIG. 4 illustrates a method of indexing influence information for storage and retrieval.

FIG. 4 illustrates a method of indexing influence information for storage and retrieval. At 400, the location buffer is generated where each pixel is an index that points to a fragment buffer for storing the influence information. At 402, for each influence generated during re-rendering of the scene, the next location is obtained for influences of the current pixel. At 404, a value in the location buffer is increments to advance to the next location. At 406, the influence information is written to an output buffer.

Algorithm Overview

The algorithm handles scene traversals that generate the fragments in an arbitrary order and then sort the fragments during the resolve pass. This is accomplished by two passes over the scene: the first pass gathers information about how many fragments affect a given pixel, and the second pass uses the information gathered to write the data out to the fragment buffer in bins per pixel. This allows the final sort to be performed since each pixel is sorted independently and has a low number of elements to sort. Sorting all the fragments and pixels together is expensive, whereas computing n individual sorts fits well in the GPU (graphics processing unit) model of m processors.

A difference from standard rendering is that traditional rasterization requires only one pass over the scene. To optimize for overdraw, a second pass is sometimes added to calculate the closest depth value for each pixel. The disclosed algorithm adds a third pass over the geometry to optimize for the transparent and anti-aliased fragments generated. The rendering pass is also changed to write out the fragment generated instead of immediately resolving the fragment into the render target. The final render target values are then generated by the resolve step that occurs when all rendering is completed.

As a general summary for scene rendering, the algorithm includes a count pass, a prefix sum pass, a render pass, and then a resolve pass. The count pass renders the entire scene with a discard for pixels that are not visible or completely transparent. A blend mode on the integer render target is set to 1+CurValue. The prefix sum phase generates a value per pixel that is the value of all other pixels that are "before" the pixel. This value can be used as an index into the location buffer for storing all the fragments for a given pixel in the fragment buffer. The render pass renders the entire scene. The outputs from the pixel shader are written to the bin indicated by the location information generated in the prefix sum phase. The resolve phase uses the locations (or location information) generated in the prefix sum phase to process the fragments for a given pixel to a final color.

More specifically, the count pass consists of a traversal of the scene to count the fragments that influence a given pixel. The count pass can be implemented by current rasterization hardware by binding a count buffer as the rendertarget and setting up the blend mode to add one to the target when a pixel passes the depth test and the pixel shader has not called discard.

Once the counts of fragments per pixel have been generated in the count pass process, the data should be transformed into a set of offsets that allow the final rendering pass to directly write out the results without sorting, counting, etc. This phase performs an O(n) operation that given a count of fragments per pixel generates a value that is the sum of the counts that precede the pixel in the fragment buffer. This operation reserves storage in the fragment buffer for the fragments that correspond to each pixel. The order in which pixels are stored in the location buffer buffer can be optimized to improve locality of writes to the fragment buffer. In other words, what is before a pixel can be the previous pixel in a specific tile or swizzle pattern, or the pixels can be grouped on the set of computations required to resolve the pixels.

The render pass is very similar to the standard rendering pass performed by applications. The scene traversal and shader invocation is the same as it would be directly rasterized. The main difference is that the results of the fragments generated are not immediately resolved into the rendertarget. This affects certain situations where the depth test is changed multiple times per frame, since the depth of a primitive only matters for culling against the depth buffer generated in the depth prepass and the main handling of depth order is postponed to the resolve shader.

Once all the fragments have been generated, a pass over each pixel's fragments is performed to generate the final color for each pixel shader. The resolve shader (or resolver component 116) provides a count of fragments that affects the pixel and an offset in the location buffer for the next fragment buffer location. The shader then correctly resolves the set of fragments into a final color.

Figure 5:
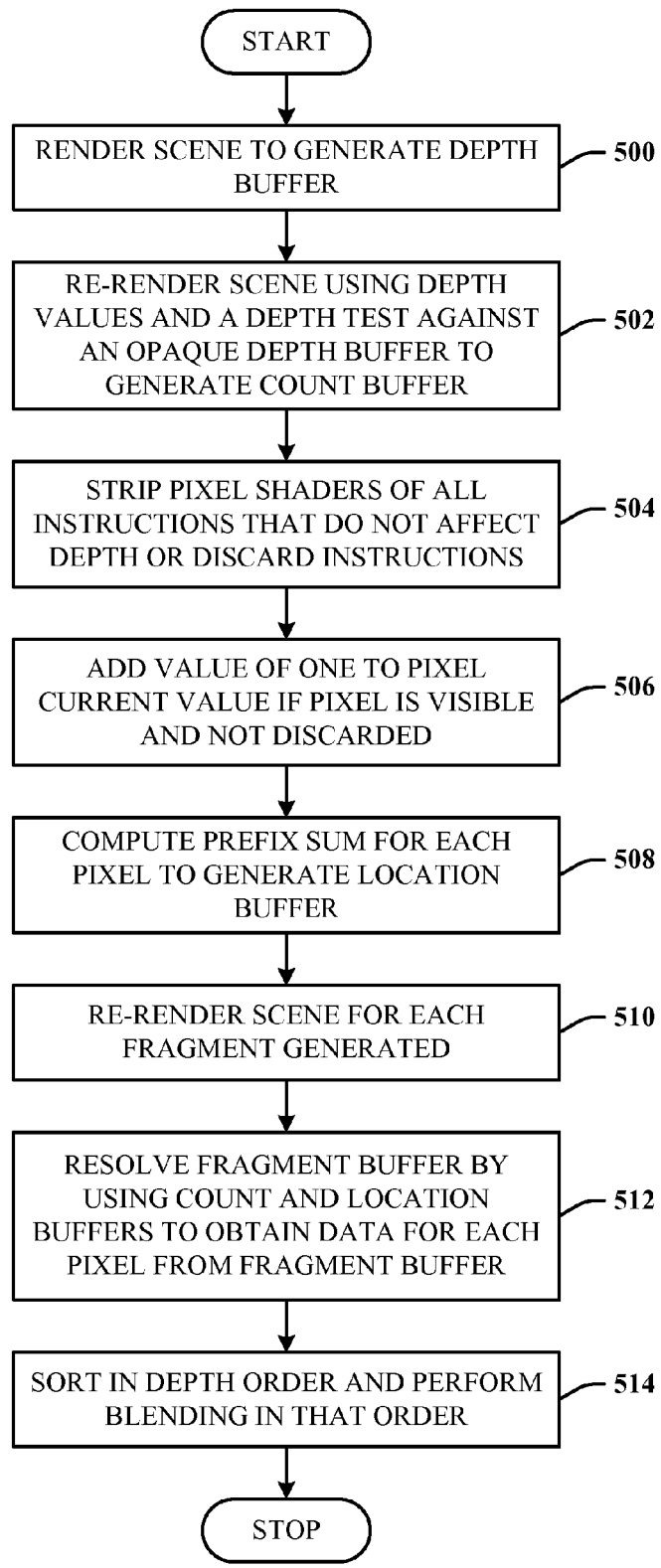
FIG. 5 illustrates a more detailed exemplary method for rendering a scene using a linearized A-buffer in accordance with the disclosed architecture.

FIG. 5 illustrates a more detailed exemplary method for rendering a scene using a linearized A-buffer in accordance with the disclosed architecture. At 500, the scene is rendered to generate a depth buffer (also referred to as a Z-buffer). This Z prepass limits both the number of fragments to store and the calculations on non-visible fragments. At 502, the scene is re-rendered using depth values with a depth test against an opaque depth buffer to generate a count buffer (VDC per pixel). At 504, the pixel shaders are stripped of all instructions that do not affect the depth or discard instructions. The pixel shader does not output anything. At 506, a value of one is added to the pixel current value if the pixel is visible and not discarded. At 508, the prefix sum of each pixel's VDC is computed to generate a location buffer. Each pixel is the sum of all preceding pixels, each sum is an offset (in the location buffer) to a bin that will store all fragments for the given pixel and all bins are located in a contiguous buffer called the fragment buffer.

At 510, the scene is re-rendered for each fragment (e.g., color, depth, alpha). The offset is read to the next storage location for the current pixel. A fragment is written to the fragment buffer at the given location using the "pointer" or index from the location buffer. The offset is then incremented and stored back to the location buffer. At 512, the fragment buffer is resolved by using the count and location buffers to obtain data for each pixel from the fragment buffer. The fragments are then resolved for the pixel. At 514, the fragments are sorted in depth order, and blending is performed in that order to render the final scene.

The resolve phase is analogous to a ResolveSubresource that happens before use of a MSAA rendertarget. For the transparency scenario, the multiple layers of translucent fragments should be blended as well as handling the visibility determination at the sample level. For non-anti-aliased rendering, the resolve shader should sort each set of fragments by the center depth and then blend the fragments together in a back-to-front order generated by the sort. For anti-aliased rendering, the resolve shader blends the fragments in back-to-front order for the depths at each sample position, and then blends the values generated to get the final pixel color. Only the transparent pixels need to be sorted. The other values can be resolved to the closest sample lit directly.

Some transparency methods handle sorting and other parts of what fits into the described resolve phase earlier. That is, some methods sort on insertion into the list of fragments per pixel, and others such as depth peeling find the "next" entry in the list in each pass and execute passes until the result is fully sorted. The work that happens in the resolve phase is work that could occur in other parts of the pipeline, but it has been chosen to be done here in order to minimize work in other areas (e.g., the rendering pass) or the work can be done more efficiently in a group at this point of the pipeline.

Memory access is minimal during the rendering pass because the data is not sorted or resolved at the sample level during the render pass. Instead the data is stored to be resolved to the final pixel color once all the information is in. This allows for a more efficient sort $-O(n*\log(n)^2)$ VS. $O(n^2)$. Performing the sorts in a coherent manner in the resolve phase also allows for efficient usage of SIMD hardware.

Memory storage is also minimized for anti-aliasing. Since fragments are not expanded to sample level information until the resolve phase, the memory storage of a P-Buffer with anti-aliasing is less than a rendertarget with a similar high level of anti-aliasing. Compression mechanisms exist for more efficiently handling compressed scenarios with MSAA render targets, but those look to not be efficient enough in the high sample count scenarios (e.g., 32+ samples).

Another aspect of the anti-aliasing expansion to sample level information is that the expansion is done during resolve processing in the resolve phase and the sample values do not need to be written out to memory. The samples can be kept on chip where bandwidths are high but space is limited. On the space side, not all samples need to exist simultaneously in the resolve shader local store. A shader can be written to keep a final pixel value running sum and resolve one sample at a time, four at a time, or all of the pixels based on performance characteristics and common usage scenarios.

A convenient side effect of partitioning the fragment data by pixel in the previous passes is that each pixel can be resolved completely independently of any other pixel. This type of problem maps well to the massive parallelism that exists on the GPU. In addition, if the order in which the shader instances can be executed is partitioned into like-sized tasks, the computation is very SIMD (simple instruction, multiple data) friendly as well.

Two issues that can impact efficiency include partitioning work to maintain SIMD efficiency and the size of local storage for sorting large numbers of fragments to not limit the number of threads possible. The partitioning work can be done as part of the preprocess step needed to generate the location buffer and feeds into the second issue. The large fragment count pixels should be common in a scene, but small in number. Partitioning the pixels off into a separate "slow" group that does a different type of sort is a reasonable solution.

A property of the resolve shader (the resolver component) is that it uses the same shader hardware that implements pixel shaders. This is convenient because a resolve shader directly maps to a point being rendered to generate a pixel value for the screen. The resolve shader (e.g., the resolver component 116) uses the position that it is going to write to as a lookup value into the location and count buffers to get the location of the data in the fragment buffer and then uses those fragments to generate the output value. This operation maps well to current pixel shader capabilities. In addition, the full functionality of a pixel shader is not required, since there is only one input; the position and derivative calculations or other pixel shader type side effects such as texkill are not required.

While performing a sort and resolving the fragments at a high sample resolution can be a decent number of instructions, the common scenarios of <8 fragments per pixel result in shader invocations that only read the fragment data associated with a pixel once, and then execute instructions off of local registers to generate the final pixel color. In a world where compute density and local register bandwidth increase faster than off-chip bandwidth, doing a resolve pass scales better than doing the resolve continuously during the render pass.

The application can employ two modes to provide code to handle the resolve phase. The modes are similar to the methods that resolve an MSAA rendertarget in D3D10 (or Direct3D version 10). There is a simple mode that specifies the blend operation to use, and an advanced mode that specifies a resolve shader that obtains access to all the fragments for a given pixel for which to resolve data.

A BlendShader mode is a method of allowing the application to specify a function that is invoked whenever a transparent fragment needs to be blended with another fragment. In this mode, the software stack provides the bulk of the shader needed for resolve and makes calls to the function provided when blending a fragments contribution is required.

This mode allows the application to avoid writing performance critical sort, anti-aliasing, and work partitioning shaders, and just write the inner function used to resolve a fragment against the current "rendertarget" value.

In addition, the common scenario for applications is to do overblending and additive blending. Both of these modes can be handled by a "default" BlendShader implementation that always does an Src+InvAlpha*Dest operation. The application can choose between over and additive operations by the writing a float4(Alpha*Color, Alpha) in the pixel shader or float4(Color, 1.0f).

The scenarios supported by this mode are the following: standard over and additive blending, and applications that have more complex blend shaders that do not need to see more than a single fragment at a time to perform blending. In addition, a number of cross fragment blend operations can be supported if there is a context to store data between blend calls (e.g., similar to the context used by a callback mechanism).

To obtain good performance for the final resolve, the BlendShader program provided is specialized on several literals (compiled for a specific color data count). In addition, the shader is likely to be optimized in tandem with the shader framework used for the resolve (e.g., inlined, optimized call method, etc.).

This model should have similar or better performance than a full shader provided by the application, since more freedom is provided to the runtime and driver to provide optimal sorting and resolving code.

Note that the current data/depth can be marked as in/out so that the blend shader does not have to modify the depth or color data if not needed. This allows the shader to avoid modifying depth if it is not necessary, and the need for depth in the shader calling will get removed during the inline process. If separate in/outs are used, then it is less obvious when to do dead code removal. ColorDataCount can be a literal when compilation occurs. Following is an exemplary BlendShader prototype and an example BlendShader.

```
void BlendShaderPrototype(
    in float ColorDataCount,
    in float FragmentData[ColorDataCount],
    in float FragmentDepth
    inout float CurrentData[ColorDataCount],
    inout float CurrentDepth);
```

Following is example code for a single BlendShader.

```
void DefaultBlendShader(
    in float ColorDataCount,
```

```
        in float FragmentColors[ColorDataCount],
        in float FragmentDepth
        inout float CurrentData[ColorDataCount],
        inout float CurrentDepth)
    {
        // Only handle four components in the default (could
handle multiples)
        // NOTE: ColorDataCount is literal at compile so
this if is compiled out
        If (ColorDataCount == 4)
        {
            float InvAlpha = 1.0f / FragmentData[3];
            For (int I = 0 ; I < 4; i++)
            {
                CurrentData[i] = FragmentData[i] +
                CurrentData[i] * InvAlpha;
            }
        }
    }
```

The ResolveShader mode is a method of allowing the application full control over how resolve happens. This is the advanced model since the application is then in the position of providing all shader functionality needed to perform the correct sort, anti-aliasing, and SIMD coherent code paths.

In this mode, the application's resolve shader is invoked with the following inputs: Position to resolve, Location buffer, Count buffer, and Fragment buffer. The Resolve-Shader returns a fixed size array of floats (out float4 Colors [3]) that are written to the specified Position in the target being resolved to.

The advantage for an application using this method of access is for operations that work on the entire data set simultaneously to generate the result, that is, methods that generate approximations for deep shadow maps from the deep data for good read performance later. All the fragment depths influence the resulting approximation rather than being operations layered on top of the previous.

Similar to the BlendShader model, this model requires certain parameters to be compiled in for performance (e.g., SampleCounts, size of color data, etc.). This mode can also benefit from splitting the input data into different bins to execute together to get optimal SIMD performance.

Following is a resolve shader prototype.

```
        void ResolveShaderPrototype(
            in int2 Position,
            in Buffer Counts,
            in Buffer Offsets,
            in FragmentBuffer Fragments,
            out float ColorData[ColorDataCount]);
```

Following is example code for single sample resolve shader.

```
    void ResolveShader(
        const int MaxFragmentCount,
        const int ColorDataCount,
        uniform float4 ClearValue,
        in float2 Position,
        in Buffer Counts,
        in Buffer Offsets,
        in FragmentBuffer Fragments,
        out float ColorData[ColorDataCount])
{
    float2 DepthIndexData[MaxFragmentCount];
    float4 ColorData[MaxFragmentCount];
        // get the offset and size of the fragment data
        unsigned int NumFragments = Counts.Load(Position);
        unsigned int FragmentOffset = Offsets.Load(Position);
//Load the data
        for (int CurFragment = 0; CurFragment <
NumFragments;CurFragment++)
        {
            // load the fragment data into the depth and color
locations
            Fragments.LoadFragment(FragmentOffset, CurFragment,
                DepthIndexData[CurFragment].x,
            ColorData[CurFragment])
            // setup the sort index
            //    - storing the int in the float for convenience
            DepthIndexData[CurFragment].y = asfloat(CurFragent);
        }
        // initialize unused values, since the sort is
specialized
        //    for the maximum number of fragments
        for (int UnusedFragment = NumFragments;
            UnusedFragment < MaxFragmentCount; UnusedFragment++)
        {
            DepthIndexData[UnusedFragment].x = MAX_FLOAT;
        }
//Sort the data
        //   The sort performs 0.25*(n*log(n)² + n*log(n))
comparisions
        //      and each comparison takes 3 instructions (lt,
cmov, cmov)
        //   2 elements -> 1  cmp  3 instr
        //   4 elements -> 3  cmp  9 instr
        //   8 elements -> 24 cmp 72 instr
        //   after 8 switch to a loop based scheme - not
specialized shaders
        SortDepthIndexData(MaxFragmentCount, DepthIndexData);
// Now do the resolve of the layers
        // start with the clear value
        float4 RetValue = ClearValue;
        // now add in the contribution from all the fragments
        for (int CurFragment = 0; CurFragment < NumFragments;
CurFragment++)
        {
            float4 CurrentColor =
ColorData[asint(DepthIndexData[i].y)];
            RetValue = CurrentColor + (1–
CurrentColor.w)*RetValue;
        }
        // return the data
        ColorData = (float[4])RetValue;
}
```

Grouping computation into groups for SIMD efficiency. An aspect that should be taken into account for efficient resolve processing is that different pixels have different requirements for the operations that need to be executed to perform the resolve. For example, some pixels have a trivial resolve since there is only one fragment, and others have a large number of fragments that need to be sorted requiring a large local set of registers. A large shader that uses a switch to dynamically switch between the different resolve types could work if the pixels were coherent enough, but the shortest code path would still be penalized by the register load required by the slow path.

A way to compensate for this variance in resolve types is to split the execution of the resolution of pixels into groups that are coherent in both execution and resource requirements. This allows for some shader specialization while still maintaining the desirable property of this solution for allowing pixels to have a high variance.

Some possible groups to split out are: opaque-only fragments, low VDC with transparency, high VDC with transparency, and single fragment pixels.

Resolve shaders that need to handle anti-aliasing are more complex than resolve shaders that can assume center sampling. First, the fragments should contain information about the depth values of the fragment across the pixel and a description of the coverage of the pixel by the fragment. A common way to store these values is a depth plane and a coverage mask. In addition, there are two types of sample-based anti-aliasing that can be performed. The opaque fragments can be stored in a separate MSAA buffer and just the transparent fragments stored in the fragment buffer, or all fragments can be stored in one fragment buffer and resolved together.

Analytic anti-aliasing (AA) is also possible within this framework. A more general coverage information description is necessary (e.g., three oriented lines describing in/out rather than a coverage mask). As well as higher quality, this can save space, and possibly, computation for higher AA levels.

The main difference between an AA-capable resolve shader and a single sample resolve shader is that the sort order of the fragments should be accounted for at each of the sample locations. The straightforward method to resolve is to perform independent sorts for each sample, independent resolves for each sample, and then blend the samples together to get the pixel value. For groups of opaque fragments only the topmost fragment influences a sample, so some optimizations are possible. Some shortcuts can be taken as well that give good results with good performance improvements (e.g., sort based on furthest z value, and then handle intersections between each neighboring fragment). This shortcut gives good results because it correctly handles a fragment intersecting another but does not handle a fragment intersecting a fragment through another fragment.

The required hardware support to enable sample level resolve of a fragment is specific to the method in which depth and coverage is written into the fragment buffer. Coverage can be handled by the same bit patterns that are used for output coverage masks and as input coverage masks, but the depth should express the range of depth values that a fragment exists at for covered sample points.

Depth planes, tuple (Z, dx, dy), are a common way to express information across a primitive, and work well for depth values. The planes are easy to evaluate at specific locations within the pixel and are relatively compact. Generating a difference "plane" between two depth planes is also possible, which allows for efficient evaluation of information regarding to which plane is in front at a specific location.

Application knowledge of the depth plane format is not required if sufficient operations are exposed (e.g., the ability to evaluate at sample locations and optimizations to work with difference planes).

Hardware for AA resolves should obtain a depth plane equation out of a rasterizer stored in the fragment buffer, evaluate a fragment's depth plane at a given location, generate a difference plane from two depth planes, evaluate the difference plane at a given location, and generate a bit pattern of what is on top for a difference plane.

Following is example code for AA Resolve for the low count opaque bin.

```
// Routine for handling low count anti-aliasing where the
fragment //count is low compared to the sample count, i.e. 4
fragments for 32 //samples
//
void AAOpaqueLowCountResolveShader(
        const int MaxFragmentCount,    // ideally less than 3
or 4 for this approach
        const int ColorDataCount,
        const int SampleCount,
        uniform float4 ClearValue,
        in float2 Position,
        in Buffer Counts,
        in Buffer Offsets,
        in FragmentBuffer Fragments,
        out float ColorData[ColorDataCount])
{
    DepthPlane DepthData[MaxFragmentCount];
    int CoverageData[MaxFragmentCount];
    float4 ColorData[MaxFragmentCount];
    // get the offset and size of the fragment data
    unsigned int NumFragments = Counts.Load(Position);
    unsigned int FragmentOffset = Offsets.Load(Position);
//Load the data
    for (int CurFragment = 0; CurFragment < NumFragments; CurFragment++)
    {
        // load the fragment data into the depth and color locations
        Fragments.LoadFragment(FragmentOffset, CurFragment,
            DepthData[CurFragment],
CoverageData[CurFragment],
            ColorData[CurFragment])
    }
    float4 RetValue = 0;
    float ContributionValue = 0;
    // most low counts of AA only data come from internal edges
    //    just test one against all for influence
    for (int CurFragment = 0; CurFragment < NumFragments; CurFragment++)
    {
        int CurCovered = CoverageData[CurFragent];
        for (int OtherFragment = 0;
            OtherFragment < NumFragments; OtherFragment++)
        {
            if (iCurFragment != iOtherFragent)
            {
                int VisibleOtherSamples =
DepthData[OtherFragment].VisibleMask(DepthData[CurFragment]);
                // samples that are not present cannot obscure
                //      CurFragment samples
                int PossiblyVisibleSamples =
VisibileOtherSamples
                        &
                        CoverageData[OtherFragment];
                // unset any samples that are visible on
                //      OtherFragment
                CurCovered &= ~PossiblyVisibleSamples;
            }
        }
        // use the number of bits covered to determine
        //   the contribution of the current fragment
        int BitsCovered = CountBits(CurCovered);
        float FragmentContribution = BitsCovered * (1.0f / SampleCount);
        // add the contribution into the running some of
        //      color and contribution
        RetValue += FragmentContribution * ColorData[CurFragment];
        ContributionValue += FragmentContribution;
    }
    // add in bits not covered as the clearcolor
    RetValue += (1.0f - ContributionValue) * ClearColor;
    aColorData = (float[4])RetValue;
}
```

Example code for AA Resolve for the medium count opaque bin can be as follows.

```
// shader specialized to handle opaque only fragments
// that fit into local memory
// All fragments are loaded, then iterations are made on the
// fragments to determine influence on final color per sample
```

```
void AAOpaqueMediumCountResolveShader(
        const int MaxFragmentCount,
        const int ColorDataCount,
        const int SampleCount,
        uniform float4 ClearValue,
        in float2 Position,
        in Buffer Counts,
        in Buffer Offsets,
        in FragmentBuffer Fragments,
        out float ColorData[ColorDataCount])
{
    DepthPlane DepthData[MaxFragmentCount];
    int CoverageData[MaxFragmentCount];
    float4 ColorData[MaxFragmentCount];
    // get the offset and size of the fragment data
    unsigned int NumFragments = Counts.Load(Position);
    unsigned int FragmentOffset = Offsets.Load(Position);
//Load the data
    for (int CurFragment = 0; CurFragment < NumFragments; CurFragment++)
    {
        // load the fragment data into the depth and color locations
        Fragments.LoadFragment(FragmentOffset, CurFragment, DepthData[CurFragment], CoverageData[CurFragment], ColorData[CurFragment])
    }
    float4 RetValue = 0;
    float ContributionValue = 0;
    // loop over each sample
    // NOTE: only one sample is resolved per pass here, but it could be
    //       multiple based on the type of locality required
    for (int CurSample = 0; CurSample < NumSamples; CurSamples++)
    {
        int WhichSample = 1 << CurSample;
        float SampleDepth = MAX_FLOAT;
        int WhichFragment = -1;
        // find the fragment that is closest for the current sample
        for (int CurFragment = 0;
            CurFragment < NumFragments; CurFragment++)
        {
            if (!(CoverageData[CurFragent] & WhichSample))
                continue;
            float CurDepth =
                DepthData[CurFragment].EvaluateAt(CurSample);
            if (CurDepth < SampleDepth)
            {
                WhichFragment = CurFragment;
                SampleDepth = CurDepth;
            }
        }
        if (WhichFragment != -1)
        {
            // add the contribution into the running some
            //   of color and contribution
            RetValue += (1.0f / SampleCount)
                    * ColorData[WhichFragment];
            ContributionValue += (1.0f / SampleCount);
        }
    }
    // add in bits not covered as the clearcolor
    RetValue += (1.0f - ContributionValue) * ClearColor;
    ColorData = (float[4])RetValue;
}
```

A number of different types of sorts could be used for sorting fragments, but a good choice is bitonic. Bitonic is a good choice because it is order $O(n*\log^2(n))$ rather than $O(n^2)$; but the primary reason is that it is deterministic in operations, which is really useful for efficient SIMD execution. Since the sort for a resolve is executed within a single shader invocation, a more optimal sort (e.g., QuickSort) could be used, but it would be much less consistent in execution and therefore lower in SIMD efficiency.

With the ability to bin based on size of data input, the correct type of sort can be executed efficiently across multiple invocations, since all data in a given bin is resolved at the same time. This allows for scenarios having very high fragment counts to be handled by a completely different sort—a looping bitonic or even quicksort, versus a specialized quicksort for the less than nine fragments bin.

Even with bitonic sorts, some formulations are better suited for specialized code generation than arbitrary looping performance. The sample code that follows demonstrates a version designed for compiler specialization.

The number of comparisons for a bitonic type sort is $0.25*(n*\log^2(n)+n*\log(n))$. The minimal number of instructions is three instructions per comparison –lt, cmov, cmov. If a conditional swap instruction is added, the instruction count would be two and the register load would be two less, since the destination data is moved into two "new" registers with each comparison. The next data is moved into the previously occupied registers so the register count is not dependent on number of comparisons.

The following table is a listing of instruction counts for shaders that are specialized to a given size (e.g., no loops or indexing of arrays, just explicit references to registers for sorting).

| Data Count | Comparisons | Instructions |
| --- | --- | --- |
| 2 | 1 | 3 |
| 4 | 6 | 18 |
| 8 | 24 | 72 |
| 16 | 80 | 240 |

Following is example code that can be used to generate modified bitonic sorts.

```
// Sample code to generate a sort for a given literal size.
//    code compiles on ps_3_0 and ps_4_0 to test codegen
static const unsigned int x_cSortSize = 4;
static const unsigned int x_cLog2SortSize = 2;
float4 main(uniform float2 DepthsToSortInput[x_cSortSize],
uniform float4 ColorInputs[x_cSortSize]) : COLOR0
{
    float2 DepthsToSort[x_cSortSize] = DepthsToSortInput;
    [unroll]
    for (unsigned int iOuter = 0; iOuter < x_cLog2SortSize; iOuter++)
    {
        [unroll]
        for (int iInner = iOuter; iInner >= 0; iInner--)
        {
#if SHADERMODEL3COMPAT
            int sum = 1;
            for( uint j = 0; j < iInner; j++ )
                sum *= 2;
            int NextNeighbor = sum;
#else
            int NextNeighbor = 1 << iInner;
#endif
            // need to handle highest current layer differently
            if (iInner == iOuter)
            {
                // The first inner pass over the data requires a
                //     different codepath since it performs the bitonic split
                [unroll]
                for (int iTestStarts = 0;
                    iTestStarts < x_cSortSize / (2 *
```

-continued

```
(iInner + 1));
                        iTestStarts++)
                {
                    int iTestCurBottomValue = iTestStarts * NextNeighbor*2;
                    int iTestCurTopValue = iTestCurBottomValue + NextNeighbor*2 - 1;
                    [unroll]
                    while (iTestCurBottomValue < iTestCurTopValue)
                    {
                        bool CompareValue = DepthsToSort[iTestCurBottomValue].x < DepthsToSort[iTestCurTopValue].x;
                        float2 FirstTemp = CompareValue ? DepthsToSort[iTestCurBottomValue] : DepthsToSort[iTestCurTopValue];
                        float2 SecondTemp = CompareValue ? DepthsToSort[iTestCurTopValue] : DepthsToSort[iTestCurBottomValue];
                        DepthsToSort[iTestCurBottomValue] = FirstTemp;
                        DepthsToSort[iTestCurTopValue] = SecondTemp;
                        iTestCurBottomValue += 1;
                        iTestCurTopValue -= 1;
                    }
                }
            }
            else // sort each grouping of values in ascending order. The
                 // current pass sorts each element with one
                 // NextNeighbor away
            {
                // do iInner + 1 starts of runs of computation
                [unroll]
                for (int iTestStarts = 0;
                         iTestStarts < x_cSortSize / (2 * (iInner + 1));
                         iTestStarts++)
                {
                    int iTestStart = iTestStarts * NextNeighbor*2;
                    int iTestEnd = iTestStart + NextNeighbor;
                    [unroll]
                    for (int iTestValue = iTestStart;
                             iTestValue < iTestEnd;
                             iTestValue++)
                    {
                        bool CompareValue = DepthsToSort[iTestValue].x < DepthsToSort[iTestValue+NextNeighbor].x;
                        float2 FirstTemp = CompareValue ? DepthsToSort[iTestValue] : DepthsToSort[iTestValue+NextNeighbor];
                        float2 SecondTemp = CompareValue ? DepthsToSort[iTestValue+NextNeighbor] : DepthsToSort[iTestValue];
                        DepthsToSort[iTestValue] = FirstTemp;
                        DepthsToSort[iTestValue+NextNeighbor] = SecondTemp;
                    }
                }
            }
        }
    }
    float4 RetValue = 0;
    [unroll]
    for (int i = 0; i < x_cSortSize; i++)
    {
        float4 CurrentColor = ColorInputs[asint(DepthsToSort[i].y)].xyzw;
        RetValue = CurrentColor + (1-CurrentColor.w)*RetValue;
    }
    return RetValue;
}
```

Fallbacks

Since the amount of data to store is determined by the scene (Resolution*Avg-VDC), it is possible to encounter scenes that generate more fragments than there is memory available. Failure cases that are induced by rare complex scenes can cause issues with support for applications, so a mitigation strategy is required.

The memory that can be used for the fragment buffer should be sized appropriately for the performance of the hardware. If this is true, then it is less likely for applications to hit the memory limits than one would expect. The size of the buffer should be sufficiently large to handle scenes that are well supported by that hardware, which means that buffer sizes that are "too large" would not be fast on the specific hardware and are therefore avoided by the applications. This is analogous to the way in which games naturally avoid massive amounts of overdraw—transparent or otherwise—when building scene content due to performance issues during development.

A goal is that the memory accessible by the fragment buffer be sufficiently large so that performance has dropped significantly by the time the memory limit is reached so developers do not have an incentive to skirt with the limits.

In addition, this method of transparency is unique in that the storage requirements are calculated before generating the fragment data. It is possible to use this information to reduce the amount of storage that occurs in the generating phase. Since the scene has not been rendered yet, when the fallback is discovered to be required, it is possible to initiate the fallback without application assistance. This can be critical for maintaining the buffered rendering performance that exists today.

A number of fallback options exist for what to do when all fragments of a given scene cannot be stored. These options include drawing black, application re-render of the scene at a lower resolution, dropping layers from pixels in the fragment buffer, and generating a lower resolution fragment buffer from the high resolution prefix sum data.

A straightforward option is to skip the render pass when the data will not fit, and set all data to 0 (draw black) when doing the resolve phase. While this is an easy option to implement, the visual impact is very dramatic. The advantage is that the expensive render phase can be skipped as well, to get through the "bad" frames to the good ones that the application will generate when feedback of the situation is handled. In other words, if the application is three frames behind the hardware, include a latency of three VBlanks to a scene that fits inside limits instead of having a latency of 3*N VBlanks, where N is the number of VBlanks spent generating fragments that are not stored.

The most appealing option is to have the application re-render the scene at a resolution that fits into memory and scales up to the original resolution. This is appealing because it is the fallback option that is closest to the result if the original render had occurred. Since the Avg-VDC was calculated in the prefix sum phase, an accurate estimate of the required downsized rendering is available as well.

A problem is that this requires the application to be in-sync with the hardware. The application would not be able to start queuing the next frame's commands until the prefix sum phase has been completed, or the API would have to be structured to allow for the entire scene traversal to be stored in an execute buffer than can be re-executed. In theory, re-execution of a set of command buffers is straightforward, but side-effects (e.g., render-targets, streamout) make this hard.

Another appealing solution is to not store fragments that do not influence the result noticeably. The problem here is that the order that fragments are generated and stored is not indicative of importance. Decrementing the counts for individual pixels limits the data stored for that pixel, but does not cleanly remove uninteresting fragments. The side effects for limiting the VDC of pixels are very non-deterministic and likely to be very objectionable.

Limiting fragments stored is an interesting problem. The depth pre-pass is a good example of a method of trying to lower the Avg-VDC. Pre-passes that take advantage of large mostly opaque occludes (e.g., dense smoke clouds) can also be done by the application to lower the Avg-VDC as well.

Another option is to drop entire pixels from the fragment buffer and reconstruct a probable value during the resolve phase from neighbor values. Dropping entire pixels is an easy operation when done as part of the prefix sum phase; just mark the count of fragments for the pixels to drop as zero and re-run the prefix sum. The logic to catch mismatch between the precalc and render passes will keep the data generated for the dropped pixels to be stored. Generating a reasonable value for the dropped pixels is done by averaging the neighbors of dropped pixels together.

From a visual aspect, this is not as appealing as re-rendering the entire result at a lower resolution due to artifacts from dropped pixels (e.g., high frequency drawing such as fonts are poorly reconstructed). For game content, a frame or two with minimal dropping of pixels before the scene content goes back to normal or the application starts to re-render at a lower resolution can be a reasonable trade-off. The expectation is that a scene event such as a massive explosion just occurred has already dropped the frame rate to single digits and that the game is already in "bad" behavior mode so minor visual issues are acceptable.

Since even a single pixel can have sufficient memory usage to not fit in memory, there are some situations that falling all the way back to drawing black is necessary. The fallback scheme can be made complicated or simple, for example, trying to make the hard limit softer versus making the limit appear to not exist. The assumption here is that the failure case should be a rare occurrence and that trying to make the limit appear higher but not arbitrarily high is desirable. An exemplary fallback set is the following:

| | |
|---|---|
| <=1 | Draw frame normally |
| <=4 | Set $3/4^{th}$ of pixels to not store and reconstruct during resolve |
| <=16 | Set $15/16^{th}$ of pixels to not store and reconstruct during resole |
| >16 | Draw Black |

While it is possible to continue to reduce the pixel count all the way to one, the rasterization and shader computations required are the same for the fallback downsample and the full render. If the number of fragments is sixteen times the maximum fragment buffer, then the application is seriously overcommitted for resources for the frame and drawing black is likely the best user behavior. In addition, the form of lowering of resolution performed by the fallback can have very serious artifacts if too many pixels are dropped. Re-Rendering at a lower resolution (even 128×128) will look much better than using $1/64^{th}$ of the pixels of 1280×1024 to generate a 1280×1024 image.

The fallback for this method can be setup ahead of time in the command buffers. When the prefix sum is added to the command buffer for the GPU, a predicated set of commands that handle the fallback can be added. This allows the consumption of the command buffers to be the same as today, rather introducing a synchronization point. Communication with the video memory manager can occur before starting the rendering pass, but not communication with the application or user mode driver.

Figure 6:
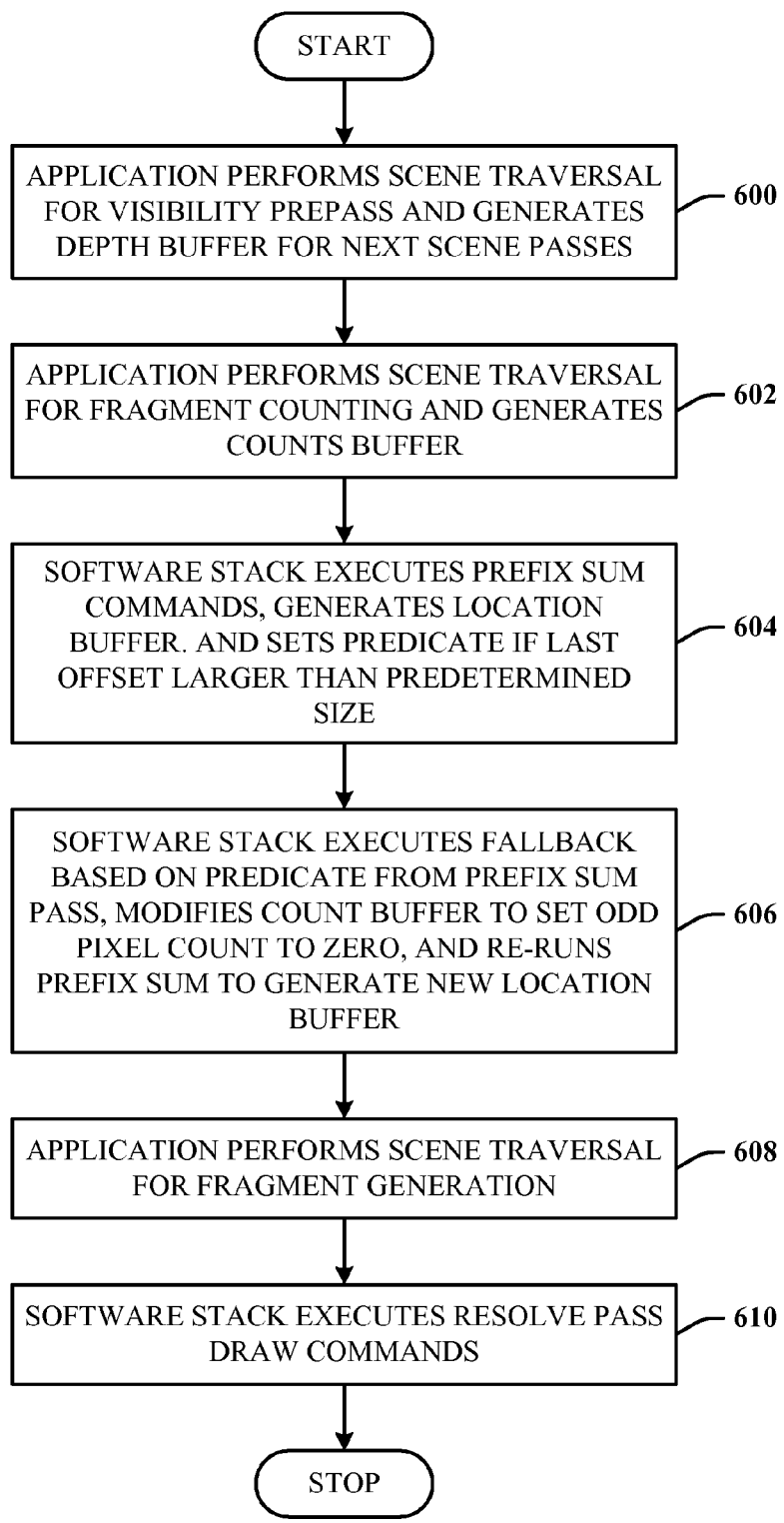
FIG. 6 illustrates an exemplary method of command buffer execution including fallback.

FIG. 6 illustrates an exemplary method of command buffer execution including fallback. At 600, an application performs scene traversal for visibility prepass and generates a depth buffer for subsequent (e.g., two) scene passes. At 602, the application performs scene traversal for fragment counting and generates a count buffer. At 604, the software stack executes prefix sum commands, generates a location buffer, and sets a predicate if the last offset is larger than a predetermined size. At 606, the software stack executes fallback based on the predicate from the prefix sum pass, modifies the count buffer to reset every odd pixel count set to zero, and re-runs the prefix sum to generate a new location buffer. At 608, the application performs scene traversal for fragment generation. At 610, the software stack executes resolve pass draw commands.

Figure 7:
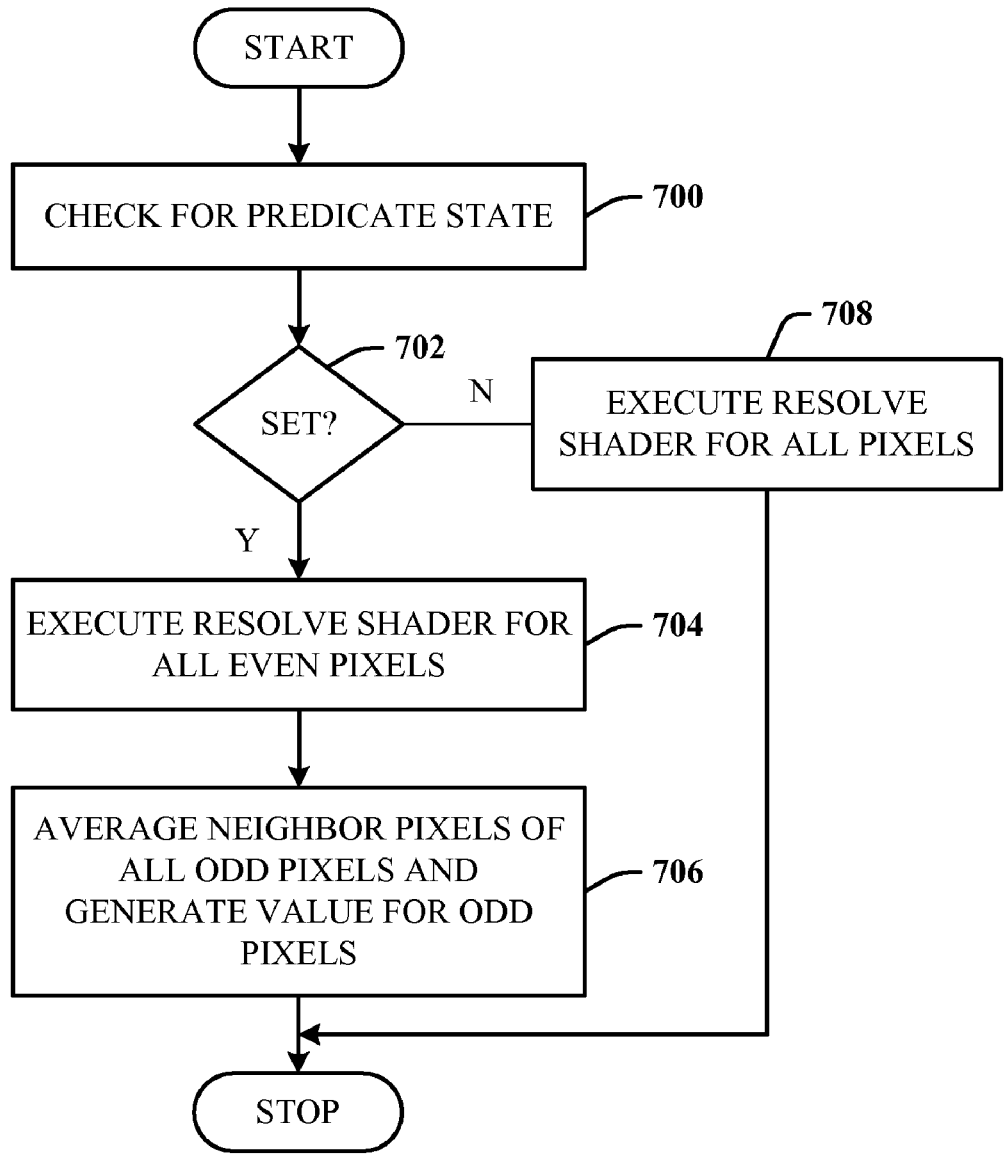
FIG. 7 illustrates a method of predicate processing for the resolve pass draw commands.

FIG. 7 illustrates a method of predicate processing for the resolve pass draw commands. At 700, a check is made of the predicate state. At 702, if the predicate is set, flow is to 704 to execute the resolve shader for all even pixels. At 706, the neighbor pixels to all odd pixels are then averaged to generate a value for the odd pixels. At 702, if the predicate is not set, flow is to 708 where the resolve shader is executed for all pixels.

Figure 8:
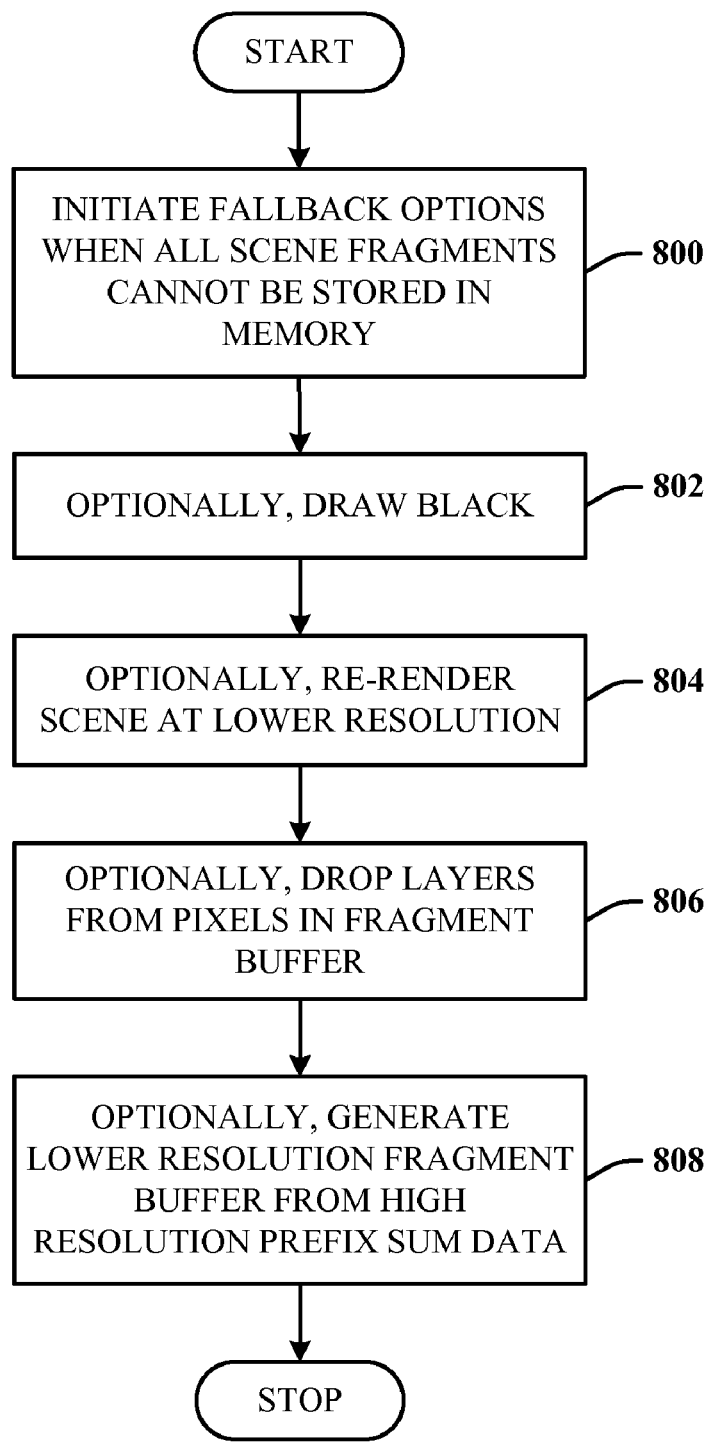
FIG. 8 illustrates a method of processing fallback options when all scene fragments cannot be stored in memory.

FIG. 8 illustrates a method of processing fallback options when all scene fragments cannot be stored in memory. At 800, fallback options are initiated. At 802, optionally, draw black. At 804, optionally, the application can re-render the scene at a lower resolution. At 806, optionally, drop layers from pixels in the fragment (or location) buffer. At 808, optionally, generate a lower resolution fragment buffer from the high resolution prefix sum data.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 9:
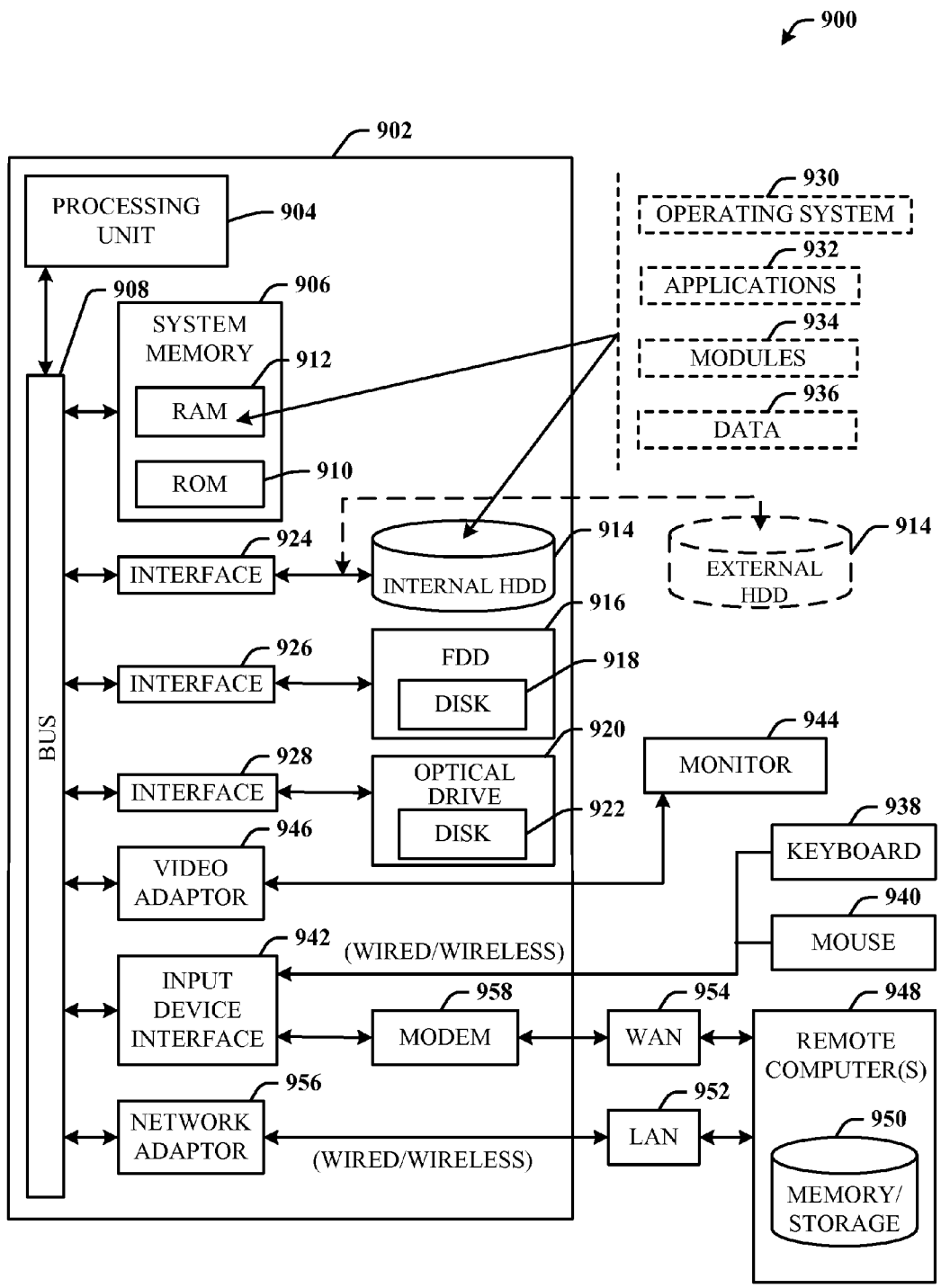
FIG. 9 illustrates a block diagram of a computing system operable to execute hardware rendering in accordance with the disclosed architecture.

Referring now to FIG. 9, there is illustrated a block diagram of a computing system 900 operable to execute hardware rendering in accordance with the disclosed architecture. In order to provide additional context for various aspects thereof, FIG. 9 and the following discussion are intended to provide a brief, general description of a suitable computing system 900 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 9, the exemplary computing system 900 for implementing various aspects includes a computer 902, the computer 902 including a processing unit 904, a system memory 906 and a system bus 908. The system bus 908 provides an interface for system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 912, including an operating system 930, one or more application programs 932, other program modules 934 and program data 936. The one or more application programs 932, other program modules 934 and program data 936 can include the counts component 102, counts buffer 104, summing component 110, location buffer 112, fragment buffer 114, and resolver component 116 of FIG. 1, and the fallback component 202 of FIG. 2, for example. The buffers (e.g., 104, 112 and 114) can be created and utilized in the memory 912, for example.

All or portions of the operating system, applications, modules, and/or data can also be cached in the RAM 912. It is to be appreciated that the disclosed architecture can be implemented with various commercially available operating systems or combinations of operating systems.

A user can enter commands and information into the computer 902 through one or more wire/wireless input devices, for example, a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wire and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the local network 952 through a wire and/or wireless communication network interface or adapter 956. The adaptor 956 may facilitate wire or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Communications can be facilitated via a wire (including optical fiber) and/or wireless technology. The client(s) 2502 are operatively connected to one or more client data store(s) 2508 that can be employed to store information local to the client(s) 2502 (e.g., cookie(s) and/or associated contextual information). Similarly, the server(s) 2504 are operatively connected to one or more server data store(s) 2510 that can be employed to store information local to the servers 2504.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A rendering system, comprising:
   memory for storing fragments of pixels in a fragment buffer;
   a counts component for counting all fragments that visibly affect each pixel of a plurality of pixels of a scene which are rendered during a count pass of the scene and storing fragment count data for each pixel of the plurality of pixels of the scene;
   a summing component for computing prefix sums for the plurality of pixels of the scene based on the fragment count data to define locations in the memory for linear storage of all of the fragments that visibly affect the plurality of pixels of the scene within contiguous pixels bins of the fragment buffer, wherein:
      each prefix sum for a given pixel defines an index to the fragment buffer for storing all of the fragments that visibly affect the given pixel within a pixel bin for the given pixel, and
      the fragments that visibly affect the given pixel are rendered during a rendering pass of the scene that generates the fragments that visibly affect the plurality of pixels of the scene in an arbitrary order; and
   a resolver component for resolving all of the fragments that visibly affect the plurality of pixels of the scene by:
      accessing each pixel bin for each pixel based on the fragment count data and the prefix sum for each pixel, individually sorting each pixel bin, and
      resolving the fragments that visibly affect each pixel during a resolve pass of the fragment buffer.

2. The system of claim 1, wherein:
   the summing component stores location information for each pixel in a location buffer, and
   the resolver component generates a final scene based on the location information stored in the location buffer.

3. The system of claim 2, wherein the resolver component reads an offset to a next storage location in the memory based on location information stored in the location buffer for a current pixel.

4. The system of claim 1, wherein the resolver component sorts the fragments for a pixel according to a depth order.

5. The system of claim 4, wherein the resolver component performs blending according to the depth order.

6. The system of claim 1, wherein an index for a current pixel comprises a value that is incremented when a fragment for the current pixel is written to the fragment buffer.

7. The system of claim 6, wherein the index for the current pixel is used as a pointer for writing all of the fragments for the current pixel to the fragment buffer.

8. The system of claim 1, wherein a prefix sum for a given pixel is an offset to a pixel bin for the given pixel in the fragment buffer that stores all fragments for the given pixel.

9. The system of claim 1, wherein a pixel bin that stores all fragments for a previous pixel and a pixel bin that stores all fragments for a current pixel are stored contiguously in the fragment buffer.

10. The system of claim 1, further comprising a fallback component for executing a fallback process when all fragments for the scene cannot be stored in the fragment buffer.

11. A method of processing a scene, the method comprising:
    performing a count pass for counting all influences that visibly affect each pixel of a plurality of pixels rendered in scene and storing count data for each pixel of the plurality of pixels of the scene in a counts buffer;
    preforming a prefix sum pass on the counts buffer for calculating prefix sums for the plurality of pixels of the scene based on the count data and storing location information for the plurality of pixels of the scene based on the prefix sums in a location buffer, wherein:
       the location information defines locations in a contiguous buffer for linear storage of all of the influences that visibly affect the plurality of pixels of the scene within pixels bins of the contiguous buffer, and
       each prefix sum for a given pixel defines an index to the contiguous buffer for storing all of the fragments that visibly affect the given pixel within a pixel bin for the given pixel;
    performing a rendering pass on the scene that generates the influences that visibly affect the plurality of pixels of the scene in an arbitrary order;
    using the count data from the counts buffer and the location information from the location buffer to sort the influences that visibly affect the plurality of pixels of the scene into the pixels bins of the contiguous buffer; and performing a resolve pass on the contiguous buffer for resolving all of the influences that visibly affect the plurality of pixels of the scene by:
- accessing each pixel bin for each pixel based on the count data and the prefix sum for each pixel, individually sorting each pixel bin, and
- resolving the influences that visibly affect each pixel.

12. The method of claim 11, wherein:
- an index for a current pixel comprises a value that points to a location in the contiguous buffer for storing an influence for the current pixel, and
- the value is incremented when the influence for the current pixel is stored in the contiguous buffer.

13. The method of claim 11, further comprising obtaining from the location buffer a next location for storing an influence for a current pixel in the contiguous buffer.

14. The method of claim 11, further comprising advancing to a next location in the location buffer to track where a subsequent influence for the plurality of pixels of the scene is to be stored.

15. The method of claim 11, further comprising writing out all of the pixel bins of the contiguous buffer to render a final scene.

16. The method of claim 11, further comprising resolving a set of influences obtained from a pixel bin of the contiguous buffer into a final color.

17. The method of claim 11, further comprising discarding pixels that are not visible or completely transparent.

18. The method of claim 11, wherein the prefix sum for a given pixel is a value derived from count data of other pixels that are before the given pixel in the plurality of pixels.

19. The method of claim 11, further comprising processing the influences for a given pixel into a final color based on location information generated in the prefix sum pass.

20. A computer storage medium, that excludes a signal, storing computer-executable instructions that, when executed, cause a computer to:
- render a plurality of pixels of a scene;
- count all influences that visibly affect each pixel of the plurality of pixels;
- store count data for each pixel of the plurality of pixels of the scene in a counts buffer;
- calculate prefix sums for the plurality of pixels of the scene based on the count data to define locations in memory for linear storage of all of the influences that visibly affect the plurality of pixels of the scene within pixels bins of a contiguous buffer, wherein each prefix sum for a given pixel defines an index to the contiguous buffer for storing all of the influences that visibly affect the given pixel within a pixel bin for the given pixel;
- store location information for each pixel of the plurality of pixels based on the prefix sums in a location buffer;
- re-render the scene such that the influences that visibly affect the plurality of pixels of the scene are generated in an arbitrary order;
- use the count data from the counts buffer and the location information from the location buffer to sort the influences that visibly affect the plurality of pixels of the scene into the pixel bins of the contiguous buffer; and
- resolve all of the influences that visibly affect the plurality of pixels of the scene by:
  - accessing each pixel bin for each pixel based on the count data and the prefix sum for each pixel,
  - individually sorting each pixel bin, and
  - resolving the influences that visibly affect each pixel.

* * * * *